United States Patent Office 3,029,163
Patented Apr. 10, 1962

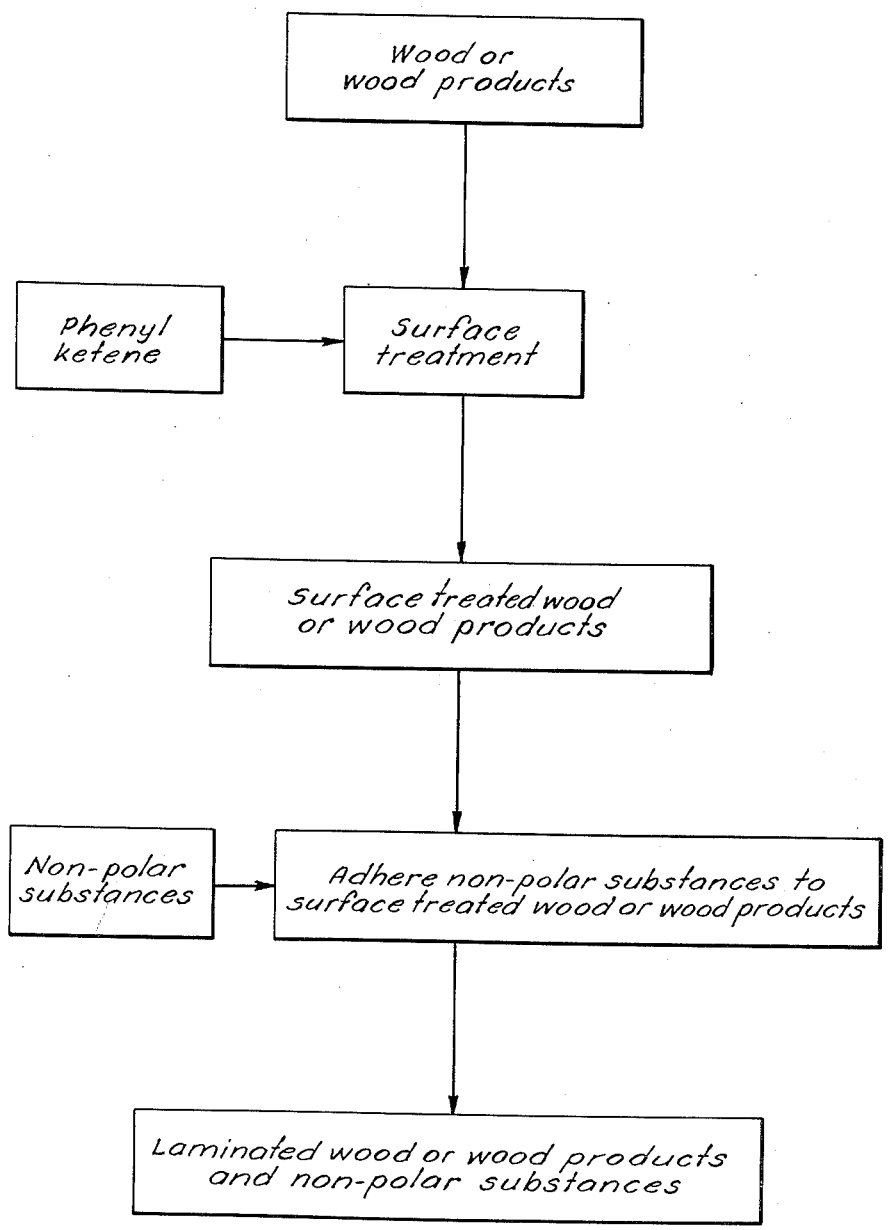

3,029,163
WOOD TREATMENT
John M. Lee, Lake Jackson, and John F. Albrecht, Jr., Brazoria, Tex., assignors to The Dow Chemical Company, Midland, Mich., a corporation of Delaware
Filed June 15, 1959, Ser. No. 820,089
3 Claims. (Cl. 117—118)

This invention relates to a treatment of wood, and is more particularly concerned with a process whereby wood and wood products may be chemically treated to enhance their adhesive qualities.

It is known in the art of cellulose chemistry that natural organic matter, when composed principally of cellulosic molecules, has a high concentration of hydroxyl radicals within its configuration. This is accountable from the fact that the cellulose herein discussed may be described as a hydrocarbon with an undetermined molecular structure, but having a composition represented by the empirical formula $(C_6H_{10}O_5)_x$.

Since a hydroxyl grouping possesses inherent polarity due to the high electron density of the oxygen atom, it likewise follows logically that a cellulose substance, with its abundance of hydroxyl radicals as shown by the formula above, should also possess polar characteristics. It is this polarity and the attendant adhesive limitations resulting therefrom that is the subject of this invention.

Although scientific knowledge regarding polarity of given chemical compounds has not advanced appreciably beyond the stage of formative speculation and theoretical logic, it is known that adhesive qualities shown by a given substance are inextricably interwoven with the presence or absence of polarity. This hypothesis has been extended to encompass the generally recognized rule that materials with high polar activity will not easily adhere to other materials possessing non-polar characteristics. Thus, a polar cellulosic material such as wood or wood products will not easily form an efficient, cohesive bond with a substance such as polystyrene which lacks polar activity.

Wood is defined as a naturally occurring substance consisting mainly of vertically oriented tubular fiber units or cells cemented together by a middle lamella. The chemical composition of such wood should contain in excess of 55% holocellulose by weight, with the remainder of such wood made up of extraneous matter varying in degree and kind with the various types of wood.

An object of this invention is to provide a method whereby the surface of a polarized materials such as wood or wood products may be chemically treated with a depolarizing reactant so as to render the surface non-polar, thereby improving the capability of forming a solid, cohesive bond with non-polar substances such as polystyrene. Since the hydroxyl grouping is the causation factor of polarity, it is an added object of the present invention to provide and utilize a chemical reactant capable of reacting with, and successfully removing all, or substantially all polar activity at the surface of the polar substance.

It has been found that the surface polarity of wood and wood products may be chemically altered by the use of organic ketenes. Ketenes are a group of highly reactive organic compounds with the general structure:

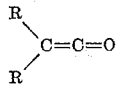

(R being any monovalent radical)

Although a ketene grouping has the decided tendency to dimerize upon formation, such dimerization may be obviated for sufficient time that alteration of the polar surface is attained. The technique for such alteration prior to dimerization is effected by producing the ketene compound, itself, while simultaneously in contact with the wood or wood product.

The drawing shows a flowsheet of the process of this invention.

This simultaneous contact may be achieved in one instance by reacting phenyl acetic acid chloride in the presence of triethylamine directly upon the surface of wood undergoing treatment. Phenyl ketene will be produced from the foregoing reaction during continuous contact with the wood, while triethylamine hydrochloride is harmlessly left as a water soluble residue.

Such reaction would appear as follows:

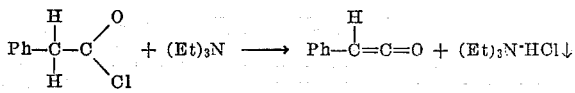

Since this treatment of food and related wood products is carried out on the exposed surfaces with the highly reactive compound, phenyl ketene, elevated pressures and temperatures are unnecessary. The phenyl ketene treatment is essentially instantaneous at room temperatures under normal atmospheric pressures. It undoubtedly could be speculated that such reaction might be accelerated or decelerated with an increase or decrease of either temperature or pressure if circumstances dictated. However, in view of the ease of treatment at room temperatures and normal atmospheric pressures, this is probably neither necessary nor desirable.

Following phenyl ketene treatment, the treated substance should be thoroughly washed and dried. Washing serves the purpose of removing residual unreacted substances as well as reaction by-products adhering to the treated surfaces. The degree of washing necessary will vary as to the amounts of reactants utilized and quantities of adhering chemicals. Drying processes may vary also, depending upon the porosity of the treated surface, drying heat utilized, and humidity of the surrounding drying area and other such limiting or extending factors. It should be noted, particularly in the case of wood and wood products, that adequate drying is essential for uniform results.

It has been found that following surface treatment with phenyl ketene and accompanying washing and drying processes, the treated substance is capable of forming a substantially more cohesive bond with non-polar substances. The shear strengths between non-polar substances and treated materials is nearly double that achieved without such phenyl ketene treatment. This result may be explained by the fact that surface polarity has either been removed or essentially removed by the treatment as heretofore described.

The following example is given to illustrate a process for treating the surface of a cellulosic, polar material such as wood or wood products, but is not to be construed as limiting the invention thereto.

EXAMPLE

Separate twenty percent anhydrous diethyl ether solutions of phenyl acetic acid chloride and triethylamine were prepared. Both solutions were poured upon a yellow pine lath in approximately equal proportions sufficient to contact the complete surface area of the lath. This reaction was conducted at room temperatures, under normal atmospheric pressure, and without the aid of additional equipment or catalytic assistance. The contact between the reactants in the presence of the wood was allowed to continue until such time as complete evaporation of the diethyl ether was attained. Following the diethyl ether evaporation, the residual deposit on the pine laths consisting essentially of crystalline phenyl ketene and triethylamine hydrochloride was thoroughly removed from the pine lath by means of successive aqueous washes. The depolarized, washed pine lath was coated with polystyrene, pressed and allowed to completely dry at room temperature for about four months, at which time the shear strength tests were conducted.

The following data and tables state in a confirmatory manner that the surface alteration was in fact attained, so as to increase adhesive quality between polar and non-polar substances.

*Table I*

| Bond No. | Untreated Wood Shear Strength, p.s.i. | Treated Wood Shear Strength, p.s.i. |
|---|---|---|
| 1 | 85 | |
| 2 | 115 | |
| 3 | 215 | |
| 4 | | 380 |
| 5 | | 430 |
| 6 | | 455 |

*Table II*

| Bond No. | Untreated Wood Shear Strength, p.s.i. | Treated Wood Shear Strength, p.s.i. | Approximate Wood Failure, percent | Comments |
|---|---|---|---|---|
| 1 | 155 | | | None. |
| 2 | 260 | | | Do. |
| 3 | 295 | | | Smooth Wood Surface. |
| 4 | 130 | | | Do. |
| 5 | 390 | | | Rough Wood Surface. |
| 6 | 160 | | | Do. |
| 7 | | 465 | 5 | Do. |
| 8 | | 500 | 10 | Do. |
| 9 | | 380 | | Smooth Wood Surface. |
| 10 | | 455 | 5 | Do. |
| 11 | | 295 | | Failure at Adhesive. Wood Interface. |
| 12 | | 345 | | None. |
| 13 | | 370 | 5 | Do. |
| 14 | | 210 | | Starved Joint. |

NOTES (1) The wood was treated with phenyl ketene in the manner described in Example 1.

(2) Simple lap joints were made for a one-inch square area using 1″ x ¼″ x 8″ yellow pine laths.

(3) The shear tests were conducted following a four month drying period.

(4) The substance utilized between the laths was a 25% solution of 200,000 molecular weight polystyrene in methyl ethyl ketone.

(5) All variables such as clamping time, pressure, cure time, open assembly and quantities of polystyrene were identical in each of the fourteen tests unless otherwise noted.

Various modifications may be made in the present invention without departing from the spirit or scope thereof, and it is to be understood that we limit ourselves only as defined in the appended claims.

We claim:

1. The process which comprises contacting the surface of wood with phenyl ketene and thereafter adhering non-polar substances to said surface.

2. The process which comprises contacting the surface of wood-products with phenyl ketene and thereafter adhering non-polar substances to said surface.

3. The process which comprises contacting the surface of wood with phenyl ketene and thereafter adhering polystyrene to said surface.

References Cited in the file of this patent

UNITED STATES PATENTS

| 2,284,896 | Hanford et al. | June 2, 1942 |
| 2,411,860 | Hentrich et al. | Dec. 3, 1946 |
| 2,430,479 | Pratt et al. | Nov. 11, 1947 |
| 2,627,477 | Downey | Feb. 3, 1953 |
| 2,762,270 | Keim et al. | Sept. 11, 1956 |
| 2,785,067 | Osberg | Mar. 12, 1957 |